(12) United States Patent  (10) Patent No.: US 7,889,607 B2
Kikugawa et al.  (45) Date of Patent: Feb. 15, 2011

(54) OPTICAL DISK DEVICE AND INTEGRATED CIRCUIT USED THEREIN

(75) Inventors: Atsushi Kikugawa, Tokyo (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 868 days.

(21) Appl. No.: 11/333,284

(22) Filed: Jan. 18, 2006

(65) Prior Publication Data
US 2007/0053262 A1  Mar. 8, 2007

(30) Foreign Application Priority Data
Sep. 8, 2005  (JP) ............................. 2005-260540

(51) Int. Cl.
*G11B 7/00* (2006.01)
(52) U.S. Cl. ............. 369/47.28; 369/47.17; 369/124.12
(58) Field of Classification Search ............. 369/47.28, 369/47.29, 106, 107, 124.1, 124.12; 69/47.17
See application file for complete search history.

(56) References Cited

U.S. PATENT DOCUMENTS

| | | | |
|---|---|---|---|
| 5,434,829 A * | 7/1995 | Maeda et al. ............. | 369/47.18 |
| 5,761,172 A | 6/1998 | Minemura et al. | |
| 5,764,166 A * | 6/1998 | Yoshimura et al. ............. | 341/58 |
| 6,034,937 A * | 3/2000 | Kumagai ................. | 369/47.26 |
| 2003/0137912 A1* | 7/2003 | Ogura ..................... | 369/47.39 |
| 2003/0152000 A1* | 8/2003 | Yamanoi et al. ......... | 369/53.22 |
| 2004/0136286 A1* | 7/2004 | Nishimura et al. ....... | 369/47.28 |
| 2005/0018579 A1* | 1/2005 | Hsiao ..................... | 369/59.22 |
| 2005/0117483 A1 | 6/2005 | Maruyama et al. | |
| 2006/0083146 A1* | 4/2006 | Isshiki et al. ........... | 369/112.03 |

FOREIGN PATENT DOCUMENTS

| | | |
|---|---|---|
| JP | 05-342762 | 12/1993 |
| JP | 06-052569 | 2/1994 |
| JP | 08-077640 | 3/1996 |
| JP | 08-221758 | 8/1996 |
| JP | 09-036746 | 2/1997 |
| JP | 2002-230814 | 8/2002 |
| JP | 2003-006874 | 1/2003 |
| JP | 2005-166122 | 6/2005 |

OTHER PUBLICATIONS

Electronic Translation of JP 05-342762.*
B. P. Lathi, "Modern Digital and Analog Communication Systems", vol. 1, Mar. 28, 1985.
Decision of Rejection for the corresponding Japanese patent application No. 2005-260540 issued Sep. 29, 2009.

* cited by examiner

*Primary Examiner*—Wayne R Young
*Assistant Examiner*—Thomas D Alunkal
(74) *Attorney, Agent, or Firm*—Antonelli, Terry, Stout & Kraus, LLP.

(57) ABSTRACT

This invention involves irradiating an optical disk with laser light, pulse-driven by a high-frequency signal from an HF oscillator, and converting the output of a photo-detector that receives laser light reflected from the optical disk into an electronic pulse readout signal using a current amplifier. The pulse readout signal is converted into a temporally continuous readout signal by a peak hold circuit. The invention solves the problems of SNR deterioration of the readout signal and the difficulty of removing the impact of high-frequency modulation accompanying the increase in the readout speed factor in optical disk devices.

5 Claims, 9 Drawing Sheets

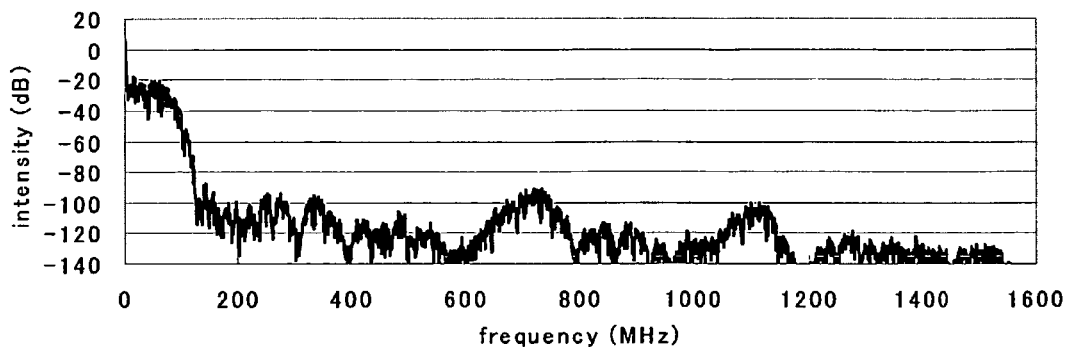
FIG. 4 A  Spectrum of readout signal (6X)
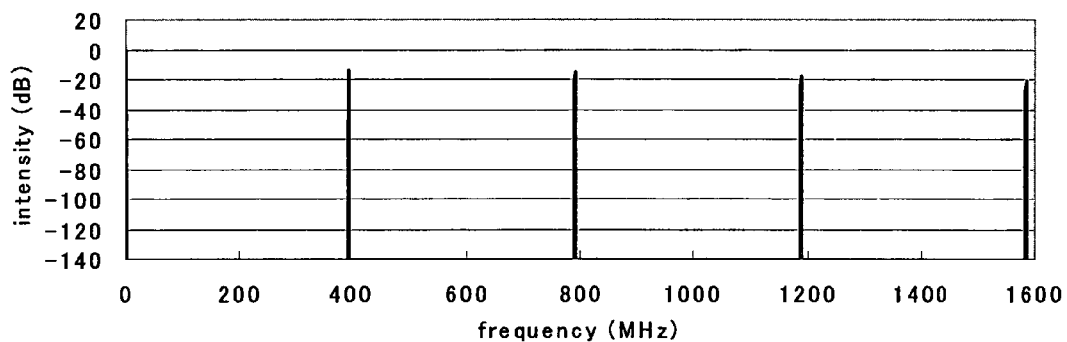
FIG. 4 B  Spectrum of HF laser pulses (396MHz)
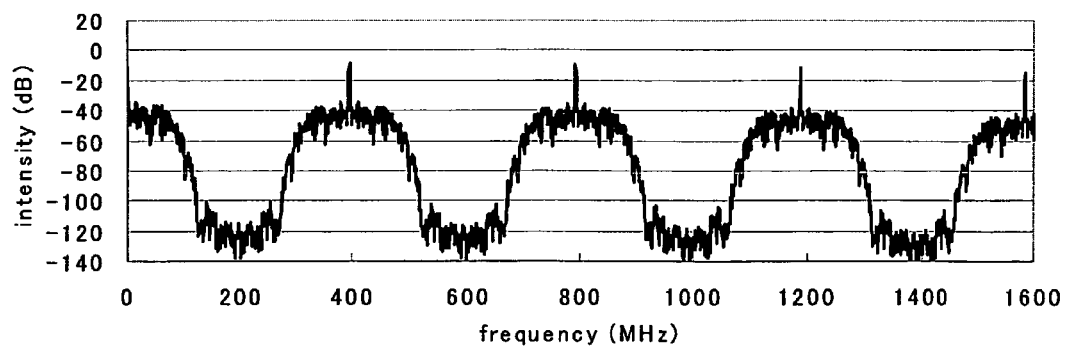
FIG. 4 C  Spectrum of pulse readout signal (6X)

FIG. 6 A  Spectrum of peak hold circuit output
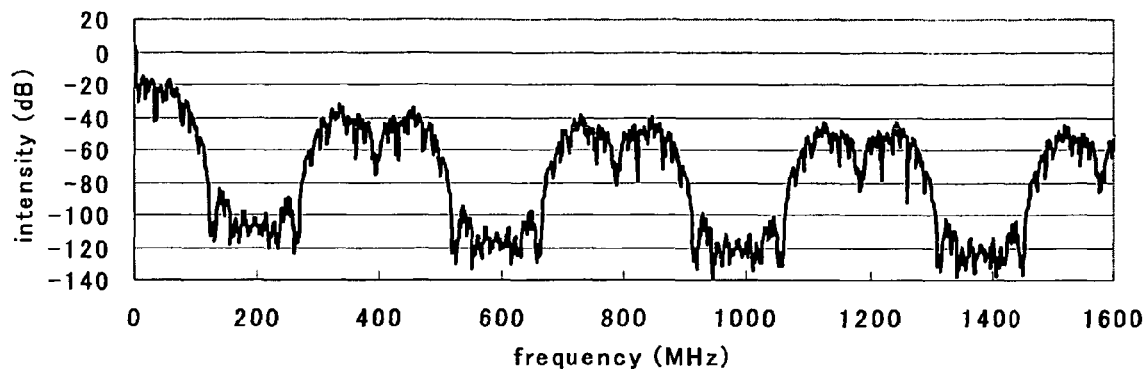
FIG. 6 B  Spectrum of peak hold circuit output after low-pass filter
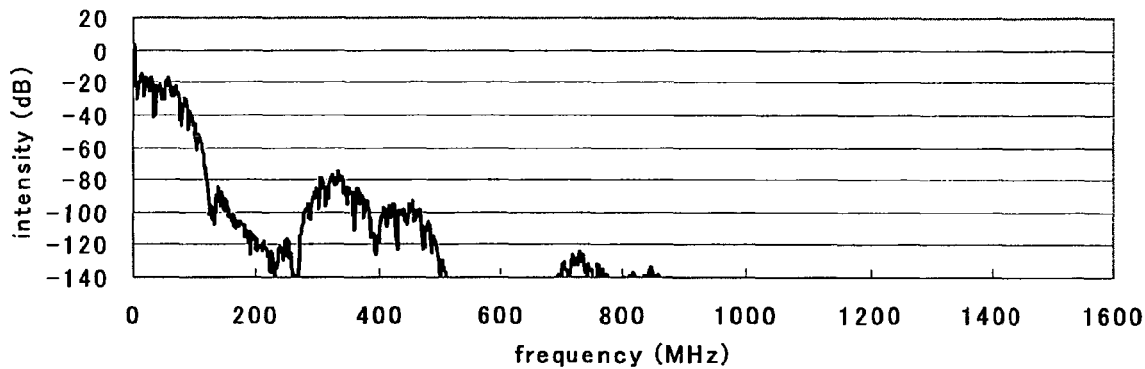

FIG. 9 A  Spectrum of peak hold circuit output
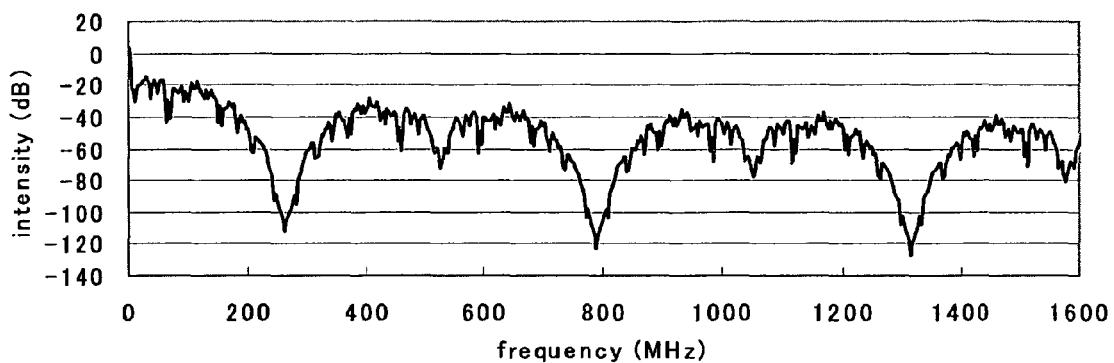
FIG. 9 B  Spectrum of peak hold circuit output after low-pass filter
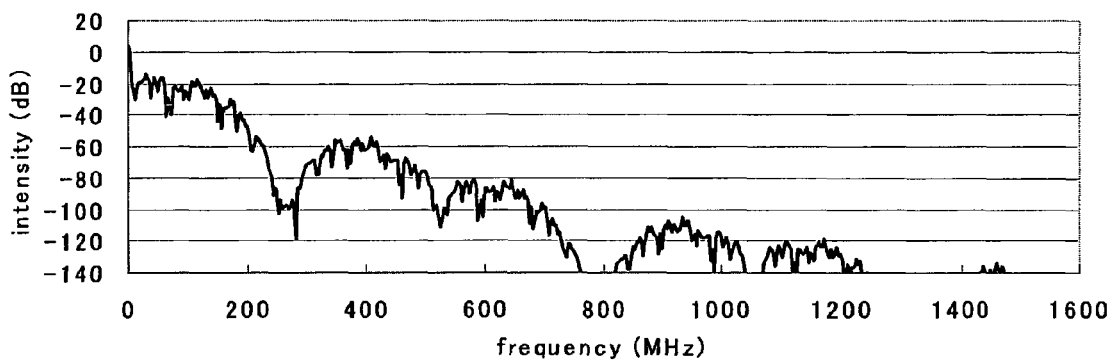

OPTICAL DISK DEVICE AND INTEGRATED CIRCUIT USED THEREIN

CLAIM OF PRIORITY

The present application claims priority from Japanese application JP 2005-260540 filed on Sep. 8, 2005, the content of which is hereby incorporated by reference into this application.

FIELD OF THE INVENTION

The present invention relates to an optical disk device, and more specifically to a circuit for performing readout of information from an optical disk.

BACKGROUND OF THE INVENTION

Most current optical disk devices such as DVDs employ high-frequency modulation to restrict noise generated by the laser diode, which is used as the light source thereof. This strategy is well known by persons skilled in the art, and therefore, the following description contains only essential features and not details.

When high-frequency modulation is used, the laser performs pulse emission. In other words, the emission waveform repeatedly alternates between emission and turned off states, as shown in FIG. 2. In this case, the laser pulse interval (frequency) and the ratio of the emission period to this (duty) are the parameters that are adjusted so that the noise due to returned light when conducting high-frequency modulation is minimized. Since the emission waveform of the laser is a shape like that shown in FIG. 2, supposing the bandwidth limitation due to the photo-diode for readout and the current to voltage converting amplifier was nil, the readout signal waveform would be a shape like that shown in FIG. 3. Hereinafter, the signal consisting of a readout pulse train shall be referred to as the pulse readout signal. The dotted line in FIG. 3 is the readout signal waveform obtained in the case that the laser is continuously oscillated at the same output as the peak of the laser pulse during high-frequency modulation. In other words, the shape of the upper envelope of the pulse readout signal becomes a readout waveform based on continuous light. Accordingly, by passing the pulse readout signal through a low-pass filter having a cutoff frequency sufficiently lower than the frequency of the high-frequency modulating current (HF frequency), it is possible to obtain the desired readout waveform. In current optical disk devices, this is achieved by bandwidth limitation using a system consisting of a photo-detector and current to voltage converting amplifier, and an analog equalizer. To give an example of modulating HF frequency, in the case of the Blu-lay Disc (hereinafter referred to as BD) system, the standard is approximately 400 MHz. This is entirely determined according to the type of laser used and the optical path length of the readout optical system, so it is thought that there is not a big difference between devices. On the other hand, the upper limit of the frequency band containing the readout signal within the basic readout speed (1×) is 16.5 MHz, since the shortest mark or space length is 2 T (T: channel clock cycle).

FIG. 4A shows an example of the readout signal spectrum during 6× readout of a BD system with a disk capacity of 25 GB. Further, FIG. 4B shows an example of the HF laser pulse train spectrum. Since it is a periodic signal, it consists of a line spectrum. Further, the HF frequency is set at 396 MHz; equivalent to the channel clock. In other words, the HF frequency is 6 times the upper limit of the readout signal spectrum. In this example, the laser pulse duty is 25%. According to the duty, the intensity ratio of each order of the line spectrum changes. FIG. 4C shows the pulse signal readout spectrum. The pulse readout signal waveform is the product of the readout waveform shown by the dotted line in FIG. 3 and the periodic HF pulse train, so its spectrum becomes a convolution of the readout signal spectrum and the pulse light spectrum. Characteristics of the pulse readout signal spectrum are that the intensity of the higher order readout signal spectrum is nearly equivalent to the intensity of the baseband readout signal spectrum, and it has a line-shaped spectrum. Therefore, when attempting to recover the readout signal, which is the baseband signal, out from the pulse readout signal by using the bandwidth limitation of the system consisting of the photo-detector and current to voltage converting amplifier, and analog equalizer, it is necessary to adequately separate the upper limit frequency of the readout signal and the HF frequency.

[Patent document 1] JP-A No. 77640/1996
[Patent document 2] JP-A No. 221758/1996
[Patent document 3] JP-A No. 230814/2002
[Non-patent document 1] Lathi, B. P., Modern Digital and Analog Communication Systems, Volume 1, HBJ, 1985, p. 223.

SUMMARY OF THE INVENTION

The improvement of the readout speed factor, one of the basic properties of optical disk devices, is constantly sought, and this also applies to BD systems. The current BD system standards (as at 2005) specify up to double speed. It is clear that the trend from here on will naturally be to demand further increases to the speed factor. In the case of BD systems, if the disk rotation speed at which reliability can be adequately ensured is 10000 rpm, the same as DVDs, the possibility exists to extend speed up to 12×.

The standards for double speed readout assume a method for obtaining a continuous readout signal from the pulse readout signal, as described in the section entitled "BACKGROUND OF THE INVENTION." However, in the case of further increases to the speed factor, at least the following two problems will arise in a system using this method. The first is a deterioration in the signal to noise ratio (SNR) accompanying an expansion of the readout signal bandwidth. The second is that due to the expansion of the readout signal bandwidth, the HF frequency and readout signal bandwidth will become closer together, making it difficult to separate the baseband readout signal and the high-order spectrum. Of these problems, the first is one that will always be faced when increasing the speed factor, whatever the method. The second problem arises in a system employing high-frequency modulation.

The second problem shall now be described in detail. As stated in the "BACKGROUND OF THE INVENTION" section, characteristics of the pulse readout signal spectrum are that the intensity of the higher order readout signal spectrum is equivalent to the intensity of the baseband readout signal spectrum, and it has a line-shaped spectrum, therefore when the readout signal upper limit frequency and HF frequency draw closer together, their separation becomes difficult. It may be considered possible to achieve their separation by raising the HF frequency, but the HF frequency is a parameter for the reduction of returned light noise, and has a particular value of necessity. If the value is simply raised, there is a limit as to how much this can be done because of increasing departure from the optimal conditions. As described in the "BACKGROUND OF THE INVENTION" section, a practical HF frequency in a BD system is approximately 400 MHz. Further, raising the HF frequency is also not seen as a good strategy from the perspective of electricity consumption.

The above description has shown that the problems to be solved by the present invention are the SNR deterioration and the difficulty of removing the impact of high-frequency modulation when increasing the readout speed factor of an optical disk device.

In order to resolve the abovementioned problems, the optical disk device according to the present invention has a means for converting a pulse readout signal into a continuous signal without losing its amplitude. Further, it has a means for performing sample and hold of the pulse readout signal's peak value for each cycle in synchronization with the HF signal. Further, it has a means for digitizing the aforementioned values that have been held. Further, it has a means for suppressing the line spectrum, which is a distortion component contained in the pulse readout signal spectrum. Further, it has a means for generating a high-frequency modulating signal in the laser drive current, completely independently of the channel clock.

As a means to convert a pulse readout signal to a continuous signal, a peak hold circuit may be used. By using a peak hold circuit, it is possible to effectively restrict line and other distortion spectrum components originating from the HF signal in the high-frequency spectrum of the pulse readout signal, making it easy to remove distortion components using a low-pass filter.

According to the present invention, the readout signal quality of an optical disk device improves dramatically. Further, it becomes easier to achieve both the high-frequency modulation conditions for laser noise reduction as well as high-speed readout.

BRIEF DESCRIPTION OF THE DRAWINGS

FIGS. 4A, 4B, and 4C are figures showing a pulse readout signal spectrum;

FIGS. 6A and 6B are figures showing the spectrum relationship between the peak hold circuit output and the low-pass filter output;

FIGS. 9A and 9B are figures showing the spectrum of the peak hold circuit output, etc. during BD 12× readout.

DETAILED DESCRIPTION OF THE PREFERRED EMBODIMENTS

Embodiments of the present invention are described below with reference to the drawings.

First Embodiment

Figure 1:
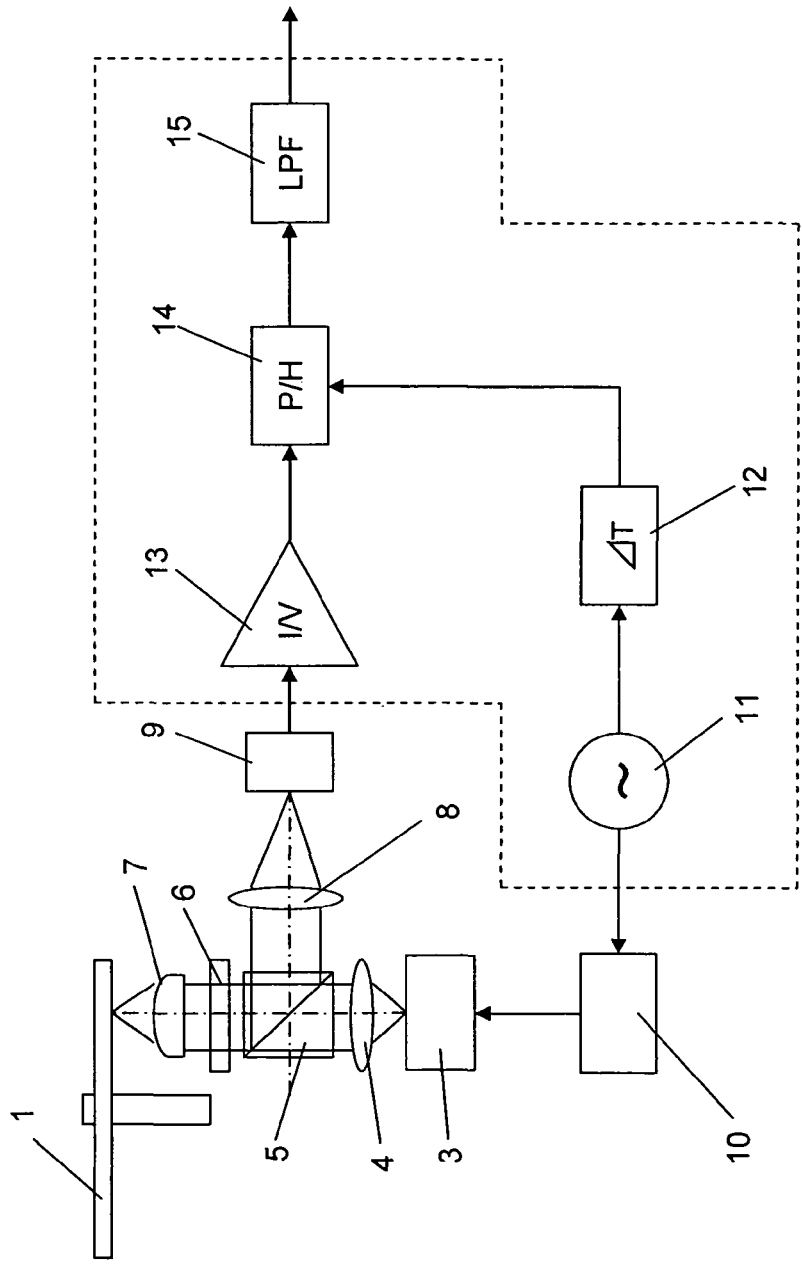
FIG. 1 is a view showing a frame format of one example of an optical disk device according to the present invention.

FIG. 1 is a view showing a frame format of one example of an optical disk device according to the present invention.

Note that in this figure, aspects not necessary for the following explanation have been omitted, and mainly the pickup is described. The present embodiment employs a peak hold circuit 14 as a means for converting the pulse readout signal to a continuous waveform. Note that the pulse readout signal is composed of a pulse train that is discrete in time, and the essences of the signal are in the time and the peak value of each pulse. In contrast, the continuous signal referred to herein is meant to be composed of not only components essentially discrete in time (pulses) like the pulse readout signal, and has a broader meaning than the ordinary meaning of a continuous signal. Therefore, it includes cases when the signal amplitude suddenly becomes 0 in a short time period.

Figure 2:
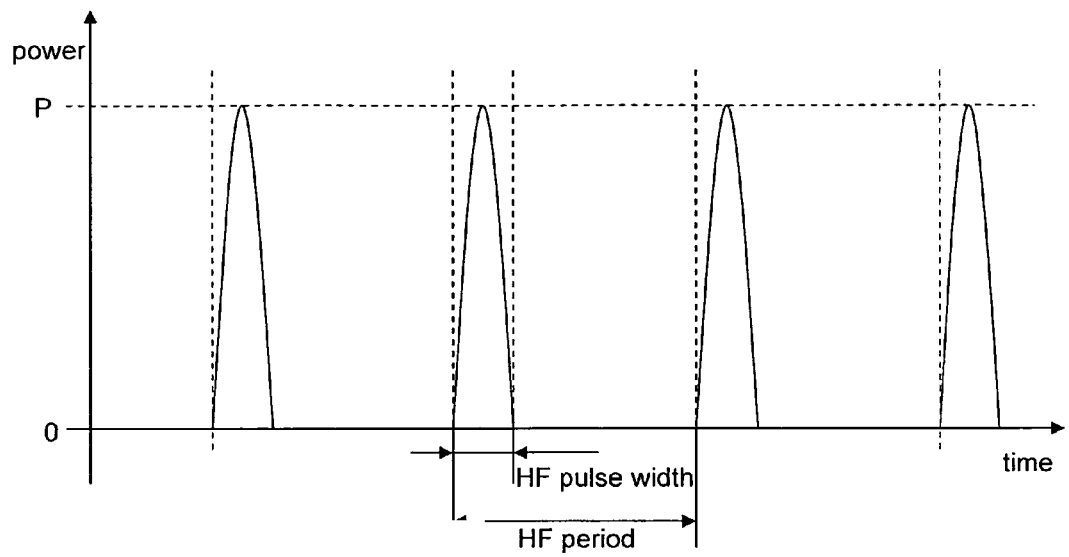
FIG. 2 is a figure explaining the state of laser emission during high-frequency modulation.

The high-frequency modulating signal (HF signal) is generated in an HF oscillator 11 and inputted into a laser driver 10. The laser driver generates a laser drive current necessary to obtain the desired average laser power, peak power, and duty, and inputs this into a laser diode 3. Further, it controls the laser drive current so that the average output of the laser becomes constant. The laser diode output light intensity changes over time as shown in FIG. 2.

The laser light is converted into parallel light by a collimator 4, and after passing through a polarizing beam splitter 5 and a quarter-wavelength plate 6, it is focused onto the recording layer of a disk 1 by an objective lens 7.

Figure 3:
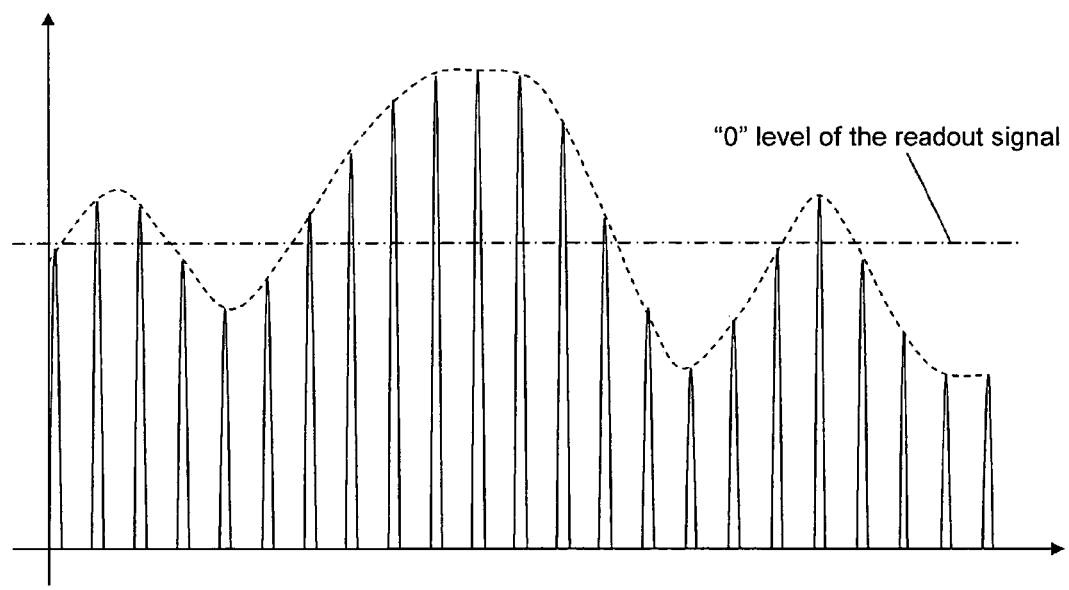
FIG. 3 is a figure explaining the definition of a pulse readout signal.

The laser light is reflected on the recording layer and becomes a reflected pulse laser train whose pulse intensity are changed according to the recorded mark and space. The change over time of the laser light intensity corresponds to the pulse readout signal shown in FIG. 3. When the reflected pulse laser train returns along the original path up to the polarized beam splitter 5, it is then reflected and focused onto a photo-diode 9 by a collector lens 8 and converted into an electric current. After being converted into a voltage signal by a current amplifier 13, this voltage signal is inputted into a peak hold circuit 14. The HF oscillator output is inputted into the peak hold circuit 14 as a control signal. However, since there is a phase difference between the HF signal and the pulse readout signal due to delay arising in the process up to the photo-diode and laser emission, this phase difference is adjusted using a variable delay line 12. Note that as stated in the "BACKGROUND OF THE INVENTION" section, FIG. 3 shows the case where the bandwidth limitation due to the photo-diode for readout and the current to voltage converting amplifier is nil. However, when there is a bandwidth limitation due to these elements, depending on its degree, it gives rise to extensions of individual pulse widths and decline of peak values, but if the bandwidth is greater than a certain amount, almost the same signal can be obtained as that shown in FIG. 3.

The effects of the peak hold circuit 14 and the continuous signal that is obtained as a result thereof will be described in detail. Note that in order to simplify the explanation, the peak hold circuit is assumed to operate ideally.

Figure 5:
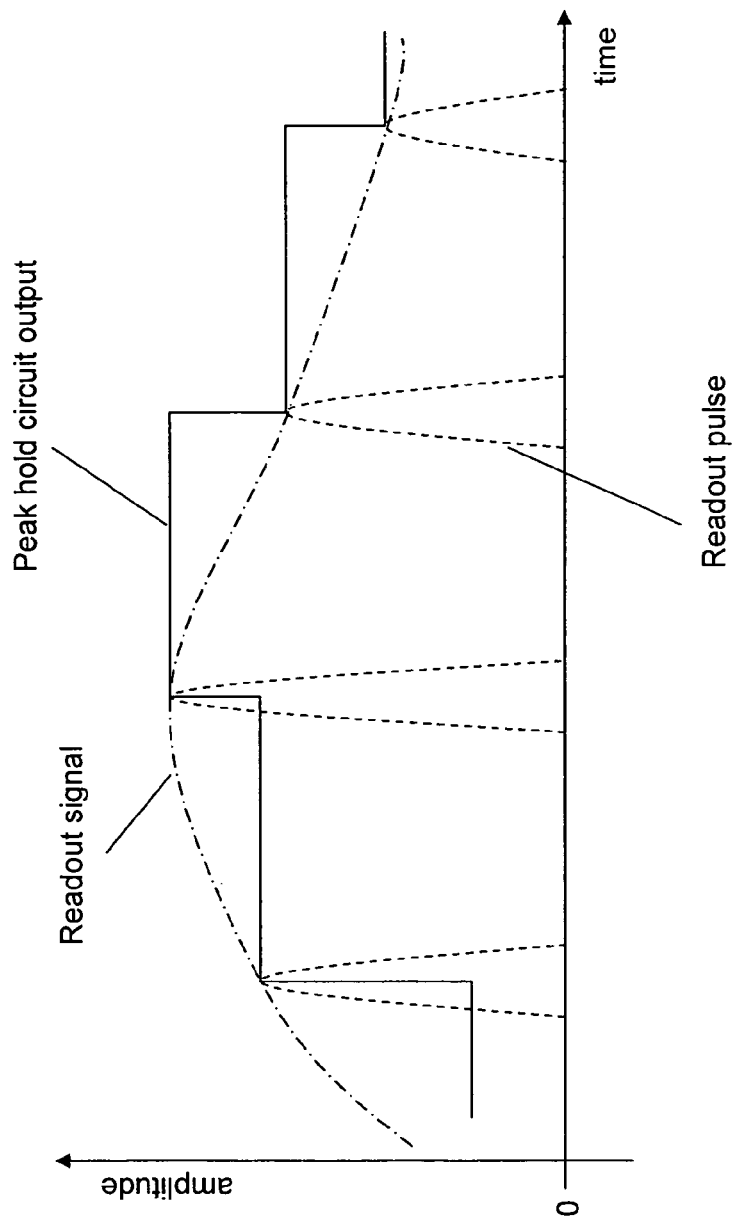
FIG. 5 is a figure showing the relationship between the pulse readout signal and the peak hold circuit output.

FIG. 5 shows the relationship between the pulse readout signal and the peak hold circuit output in FIG. 1. The dotted line is the pulse readout signal, the alternate long and short dash line is the readout signal, and the solid line is the peak hold circuit output.

FIG. 6A is an example of the peak hold circuit output spectrum in the same conditions as the pulse readout signal spectrum shown in FIG. 4. Compared to the pulse readout signal spectrum in FIG. 4C, the peak hold output spectrum has 2 significant features. One is that the harmonizing-spectrum (distortion components) does not include a line spectrum. This is decidedly advantageous when eliminating the impact of high-frequency modulation with a low-pass filter.

In other words, this is due to the fact that since in a pulse readout signal the line spectrum in the HF frequency is approximately 30 dB stronger in intensity than the readout signal spectrum, to that extent a strong suppression ratio is required with respect to the low-pass filter. Another feature is that the harmonizing spectrum (distortion components) other than the line spectrum attenuates faster than in the case of the pulse readout signal, meaning that second-order components that pose a particular problem are 20 dB lower than fundamental waves, whereas second-order component intensity in the case of the pulse readout signal is approximately the same as the fundamental spectrum.

Due to the above features, it is much easier to remove distortion components from the peak hold circuit output using a low-pass filter than in the case of a pulse readout signal. FIG. 6B shows the signal spectrum when a $6^{th}$-order Bessel low-pass filter with a cutoff frequency of 150 MHz was actually used in the peak hold circuit output spectrum in FIG. 6A. Despite being a filter with comparatively weak properties, distortion components were almost completely removed.

Figure 7:
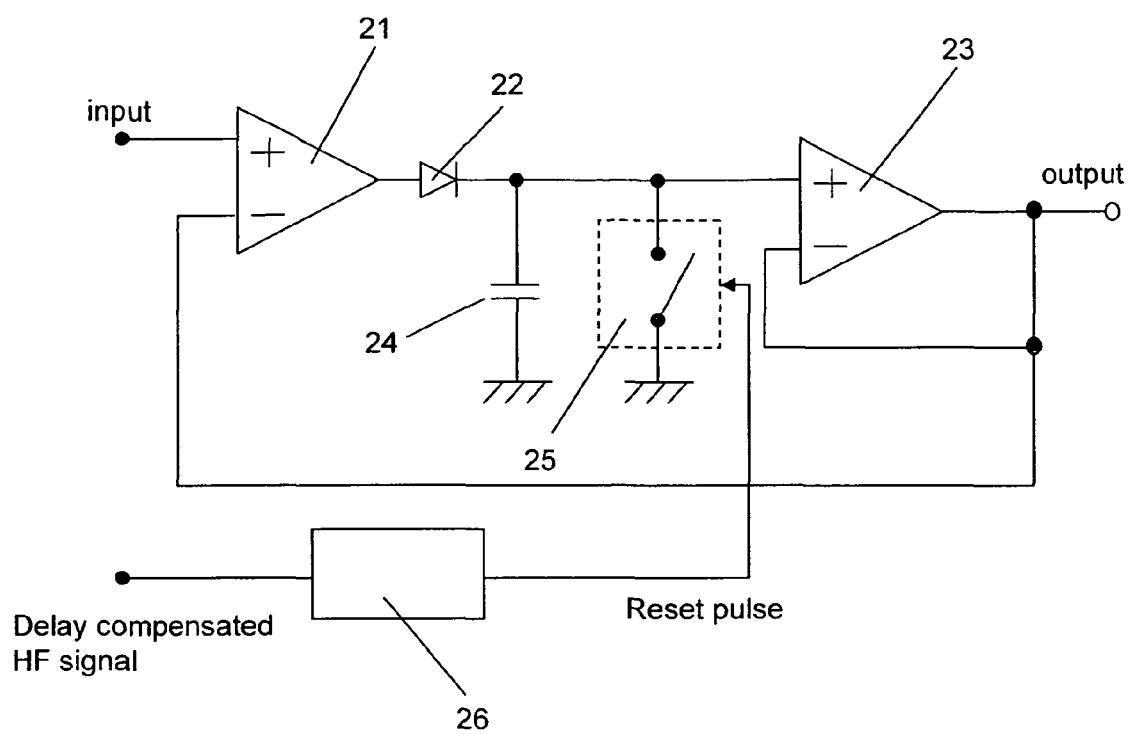
FIG. 7 is a view showing the composition of a peak hold circuit.

Several circuit systems may exist for achieving an ordinary peak hold. The peak hold circuit used in the present invention is one of these. However, what is different from ordinary systems is the fact that it performs reset in synchronization with the pulse of the pulse readout signal. FIG. 7 shows the composition of this peak hold circuit. A comparator 21 outputs a prescribed voltage in the case that the input voltage is higher than the peak hold circuit output, and charges a condenser 24. A diode 22 prevents condenser discharge in the case that the input voltage is lower than the peak hold circuit output. A buffer amplifier 23 prevents condenser discharge and at the same time outputs the voltage to the outside. When a reset switch 25 is closed for a sufficient period of time the condenser 24 loses its charge and the peak hold circuit is reset. Then, when the reset switch 25 is left open, peak hold operations resume. Accordingly, the output voltage is held at the maximum voltage that was inputted until the next reset pulse. The opening and closing of the reset switch is controlled by the reset pulse. The reset pulse is generated by a reset pulse generator 26 in synchronization with a delay-compensated HF signal. In other words, it generates a reset pulse train of a necessary length for condenser discharge, during the same cycle as the HF signal. Note that in this circuit it is important to set the condenser capacity so that it is possible to charge it in the same or shorter time as the pulse readout signal's pulse width.

Figure 8:
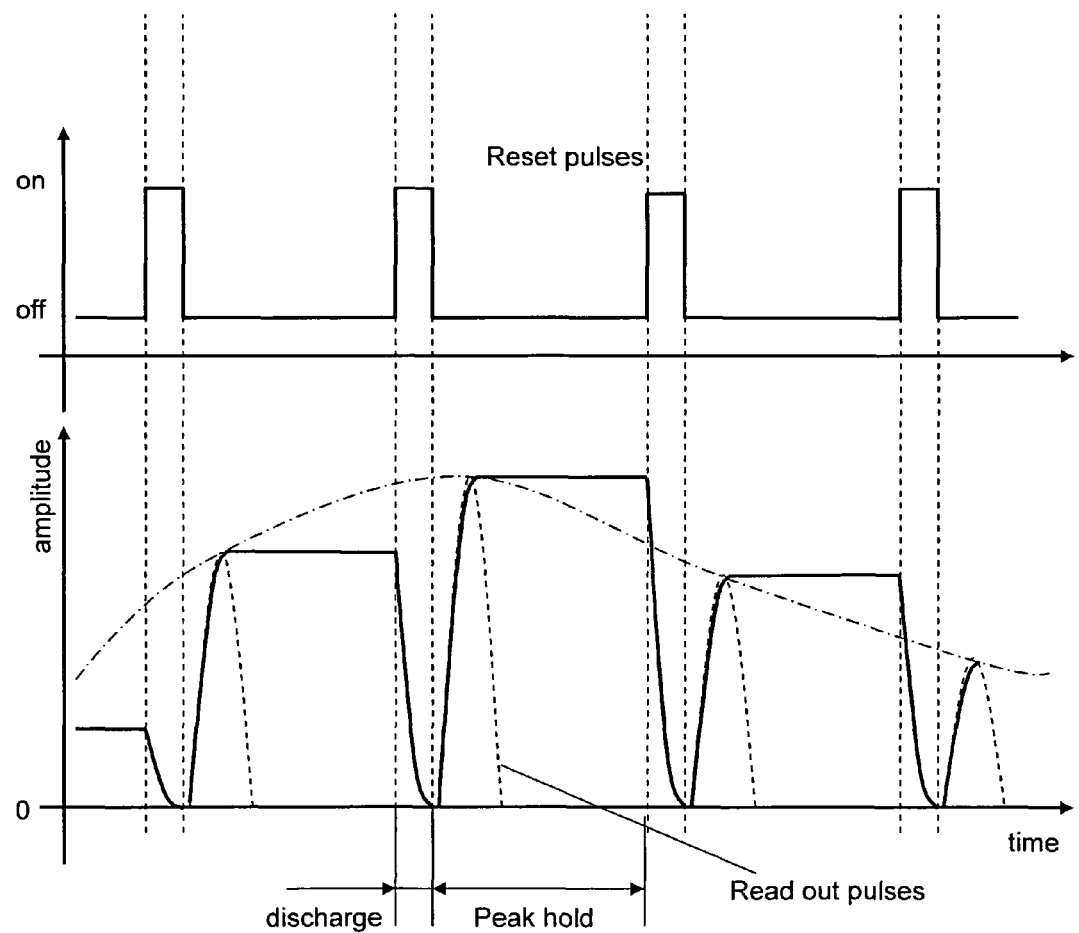
FIG. 8 is a figure showing a peak hold circuit operation diagram.

FIG. 8 shows the relationship between the pulse readout signal, the reset pulse, and the peak hold circuit output. The lower graph shows the pulse readout signal and the peak hold circuit output. The upper graph shows the reset pulse signal. The reset pulse has the same cycle as the pulse of the pulse readout signal, and during the period when the reset pulse is high, in other words when the reset switch is closed, it is set immediately before each pulse of the pulse readout signal. Thereby, a long peak hold duration can be obtained, so the peak hold circuit output approaches the ideal output. Note that if the width of the troughs of the peak hold circuit output arising due to the charging and discharging of the condenser are made sufficiently short compared to the peak hold duration, since they consist of high-frequency components, there will be no serious impact on the effects of the present invention.

As a means for converting the pulse readout signal into a continuous signal, apart from a peak hold circuit it is also possible to use a sample hold circuit or something similar. If a sample hold circuit is employed, it is necessary to perform reset according to the same cycle as the readout pulse, just as in the case of a peak hold circuit. When using a sample hold circuit one must pay attention to the fact that it is necessary to perform sample hold at the peak of each pulse of the pulse readout signal. However, since the pulse has a sharp shape, the problem arises that adjustment of the sample timing with respect to the delay amount due to the photo-diode and current amplifier is difficult. Note that there is a description in JP-A No. 77640/1996 regarding the composition in the case of receiving a pulse readout signal in a sample hold circuit. However, in JP-A No. 77640/1996, it is necessary to perform sample hold in synchronization with the channel clock in order to remove cross talk from the adjacent track by computation, whereas the channel clock has no relevance in the present embodiment, which is essentially different.

Note that of the compositional elements of the device shown in FIG. 1, it is desirable to implement the part surrounded by a dotted line with an integrated circuit. The elements outside the dotted line, such as the photo-diode 9 and the laser driver 10 may also be incorporated into the integrated circuit.

Second Embodiment

FIG. 9A is the peak hold circuit output spectrum when the present invention is applied to a 12× readout BD. From the perspective of laser noise, it was assumed that the HF frequency could not be moved very far from around 400 MHz. Accordingly, although the channel clock frequency was 792 MHz, and the 2 T frequency was 198 MHz, the HF frequency was set at 528 MHz. In this way, according to the present invention, it is possible to set the HF frequency lower than the channel clock frequency. Considering the two factors; the possibility of achieving latter stage low-pass filter properties and the overlapping of the signal spectrum below the optical cutoff frequency, we used a $6^{th}$-order Bessel low-pass filter with a cutoff frequency of 250 MHz for the final stage low-pass filter. FIG. 9B shows the spectrum after passing through the low-pass filter. According to this, the distortion component spectrum closest to the readout signal bandwidth is approximately 40 dB lower than the readout signal level. This is a level that would be completely undetected for example if the resolution of the analog to digital converter of the signal processing LSI was 7-bits or less; in other words it can be said that the distortion has been removed sufficiently.

Setting the HF frequency and the cutoff frequency of the low-pass filter when the speed is less than 12× involves a greater amount of freedom than when it is 12×, and it is possible to choose an appropriate setting according to the laser properties and so forth. When it is beneficial to set the HF frequency below 528 MHz, that is at approximately 400 MHz, the cutoff frequency and HF frequency are both decreased proportionately up to 6×, and for below 6× the HF is fixed at 400 MHz while only the cutoff frequency is reduced in accordance with the speed factor. In the case that the frequency dependency of the high-frequency modulation effect is small and there is no significant difference in noise characteristics even if the HF frequency is over 400 MHz, it is possible to use the same HF frequency and cutoff frequency as during 12× for all speed factors. Such a case has the benefit of not requiring the low-pass filter to be made programmable.

Third Embodiment

Figure 10:
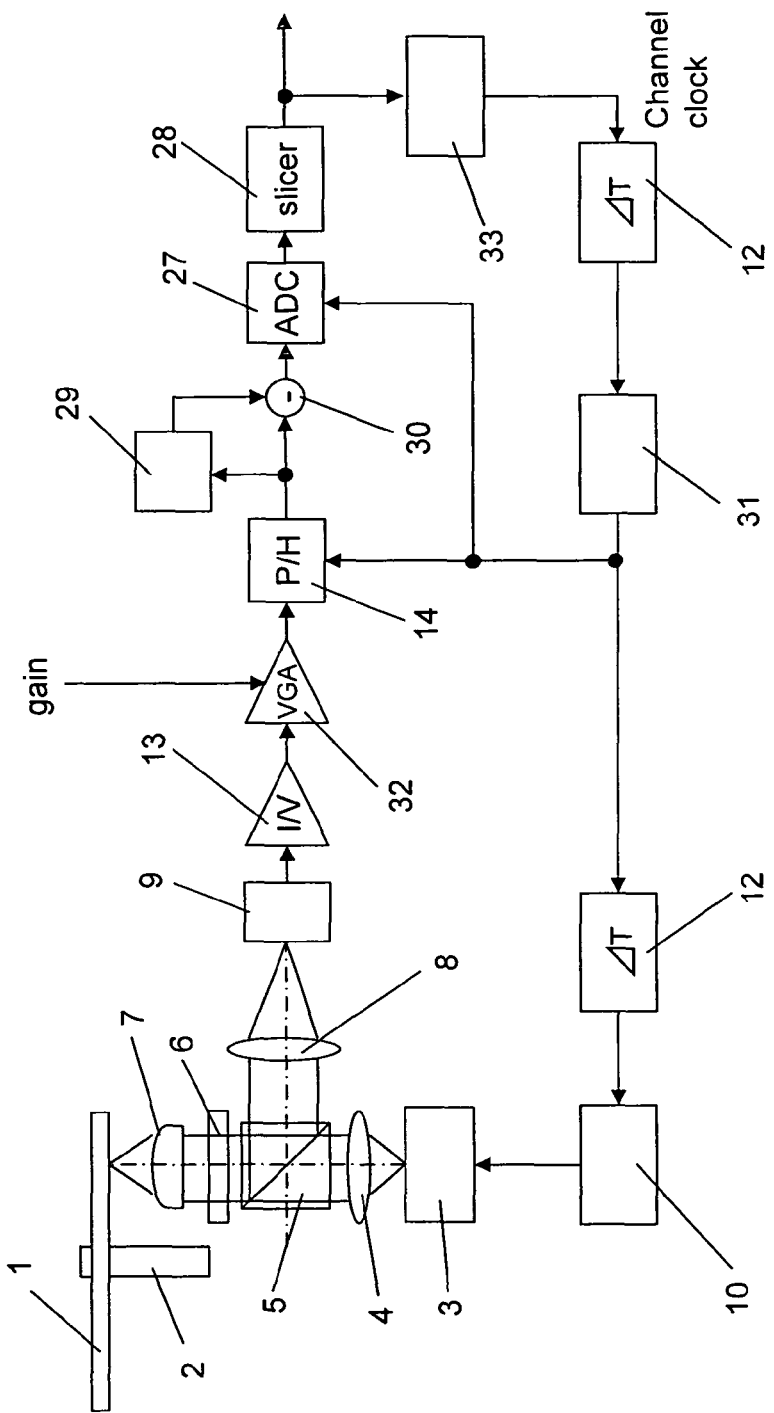
FIG. 10 is a view showing a frame format of another example of the disk device according to the present invention.

FIG. 10 is a view showing a frame format of another example of a disk drive according to the present invention. In this embodiment, each pulse of the pulse readout signal is directly converted into digital data. The process by which the HF laser pulse is converted into an electronic signal is the same as explained in the first embodiment, so explanation is omitted here. The output of the current amplifier 13 is inputted into the peak hold circuit 14 after passing through a variable gain amplifier 32. The gain of the variable gain amplifier 32 is indicated based on the readout signal amplitude detected in the signal processing system.

Usually, with an analog to digital converter, which converts analog signals to digital signals, since the subject is a continuous signal, first, amplitude information is held for a set period of time in the sample hold circuit, and then the values held for that time are converted into digital data. The mechanism that performs the latter process is sometimes called an analog to digital converter in the narrow sense. In the present embodiment, unless there are particular reasons to define it differently, an analog to digital converter shall be an analog to digital converter in the narrow sense.

One characteristic of the present embodiment is that the HF frequency is at the channel clock standard. The channel clock is recovered from the readout signal by using the PLL 33 of the signal processing system. Therefore, in terms of implementation, since it is physically separated from the system shown in FIG. 10, timing adjustment is performed with the variable delay line 12, and the operations of the peak hold circuit 14 and the analog to digital converter 27 are controlled using the channel clock after timing adjustment. Further the discrepancy between the timing of the operations of the peak hold circuit 14 and analog to digital converter 27, and the timing of HF pulse emission, caused by the laser driver 10, the photo-detector 9, the current amplifier 13 and so forth, is adjusted using another variable delay line 12. Further, during low-speed factor readout, if this is too low as the HF frequency with the channel clock, frequency multiplication of the channel clock is performed using a frequency multiplier 31, and it is used as a HF frequency and analog to digital conversion clock. Note that in this case the analog to digital conversion becomes over sampled to the extent that the channel clock is multiplied. There is no problem with processing in an over sampled state during the signal processing phase, but from the perspective of reducing electricity consumption, data is thinned before use.

Since DC components are contained in the readout signal, if each pulse amplitude of the pulse readout signal is converted from analog to digital in that state, it is the same as converting the readout signal from analog to digital for each of the DC components, and the resolution of the analog to digital converter cannot be used effectively. In order to avoid this, the present embodiment uses a subtraction circuit 30 to remove most of the DC components from the peak hold circuit output before analog to digital conversion, The amplitude of the DC components removed with the subtraction circuit 30 are the result of integrating the peak hold circuit output for a sufficiently long time using an integrator 29. The values of the DC components obtained with this method, although influenced by the asymmetry of the readout signal, are sufficient to make the 0 level of the readout signal almost match that of the analog to digital converter. After removal of DC components, they are converted to a digital signal using the analog to digital converter 27. A slicer 28 makes the center of the readout signal eyepattern match the 0 level of the signal processing system including short distance DC components, after digitalization. This is basically the same system as that used in current optical disks that perform digital signal processing.

By synchronizing the HF frequency with the channel clock, and performing direct analog to digital conversion of the peak hold circuit output with the channel clock, the present embodiment makes it no longer necessary to take into account HF frequency separation.

Patent documents 1, 2 and 3 each contain descriptions regarding a method for emitting laser light in synchronization with the channel clock. However, the present embodiment differs from the known examples because it assumes digital signal processing such as PRML, and directly converts the pulse readout signal to a digital signal.

What is claimed is:

1. An optical disk drive, comprising:
   a high-frequency oscillator;
   a laser light source;
   a light source driver for pulse-driving said laser light source based on a clock generated as an output of said high-frequency oscillator;
   an optical system for irradiating an optical disk with laser light generated from said laser light source;
   a photo-detector for receiving said laser light reflected from said optical disk;
   means for converting an output of said photo-detector to an electronic pulse readout signal, wherein said electronic pulse readout signal is a product of a waveform of said output and a periodic high-frequency pulse train; and
   means for converting said electronic pulse readout signal to a temporally continuous stepwise readout signal, wherein each pulse of said electronic pulse readout signal operates in synchronization with said clock.

2. The optical disk device according to claim 1, wherein a peak-hold circuit that performs reset and peak-hold operations in synchronization with each pulse of said electronic pulse readout signal, and a low-pass filter are used as means for converting said electronic pulse readout signal into a temporally continuous readout signal.

3. The optical disk device according to claim 1, wherein a frequency of said pulse drive is no more than a channel clock frequency.

4. The optical disk device according to claim 1, further comprising:
   a high-frequency oscillator for generating a high-frequency modulating signal that is input to said light source driver.

5. The optical disk device according to claim 1, further comprising:
   a high-frequency oscillator for generating a high-frequency modulating signal that is input to said peak-hold circuit.

* * * * *